(12) United States Patent
Oomen

(10) Patent No.: US 8,573,682 B2
(45) Date of Patent: Nov. 5, 2013

(54) VEHICLE COWL COMPONENTS ADAPTED FOR HOOD/FENDER SEALING

(71) Applicant: Shape Corp., Grand Haven, MI (US)

(72) Inventor: Craig Martin Oomen, Grand Rapids, MI (US)

(73) Assignee: Shape Corp., Grand Haven, MI (US)

( * ) Notice: Subject to any disclaimer, the term of this patent is extended or adjusted under 35 U.S.C. 154(b) by 0 days.

(21) Appl. No.: 13/666,341

(22) Filed: Nov. 1, 2012

(65) Prior Publication Data

US 2013/0113236 A1    May 9, 2013

Related U.S. Application Data

(60) Provisional application No. 61/555,670, filed on Nov. 4, 2011.

(51) Int. Cl.
*B62D 25/08* (2006.01)

(52) U.S. Cl.
USPC .................... 296/192; 296/96.21; 296/193.11

(58) Field of Classification Search
USPC .................... 296/192, 96.21, 193.11
See application file for complete search history.

(56) References Cited

U.S. PATENT DOCUMENTS

2006/0202516 A1* 9/2006 Mori ............................ 296/192
2006/0226681 A1* 10/2006 Kelly ........................... 296/192

* cited by examiner

*Primary Examiner* — Joseph Pape
(74) *Attorney, Agent, or Firm* — Price Heneveld LLP

(57) ABSTRACT

A vehicle cowl component configured to extend between a hood's rear edge and a vehicle front windshield comprises a cowl and a seal, the seal including a U-shaped cross section attached to the under-hood edge and having upwardly extending front and rear curved walls, each of the curved walls having an unconnected free end. In one embodiment, the seal is two-shot molded onto the cowl, which eliminates secondary attachment operations. A method includes steps of first-shot molding a cowl, and then second-shot molding a U-shaped seal onto the cowl along an under-hood front edge. A modified cowl includes a seal with a downwardly extending wiper for sealing engagement with a body support structure under the cowl and seal.

8 Claims, 2 Drawing Sheets

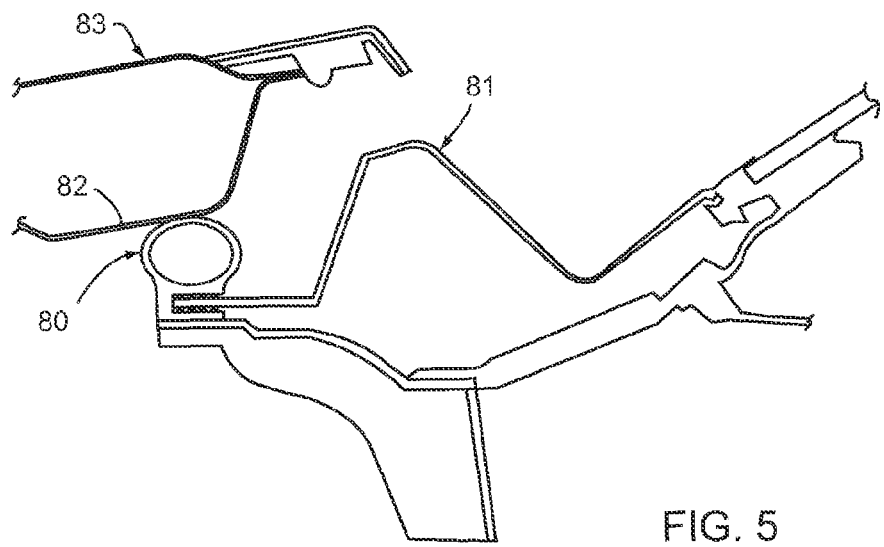
FIG. 5
Prior Art
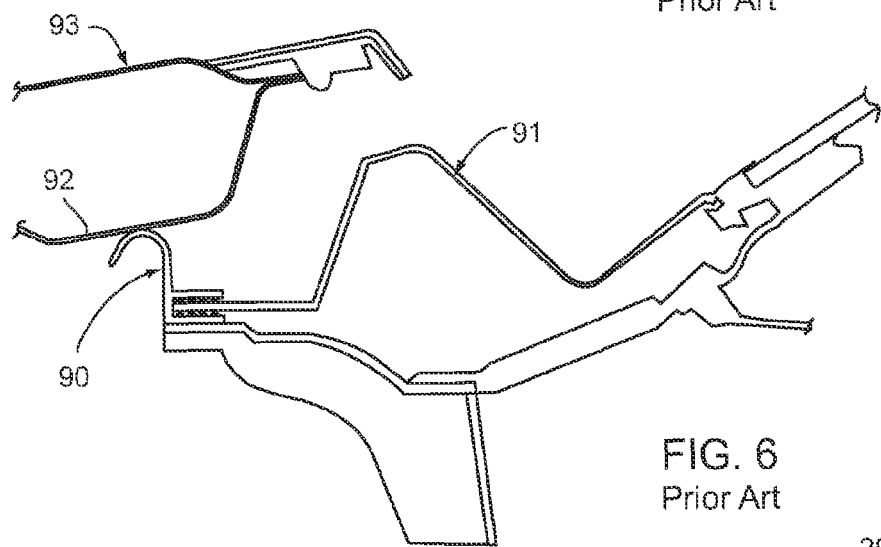
FIG. 6
Prior Art
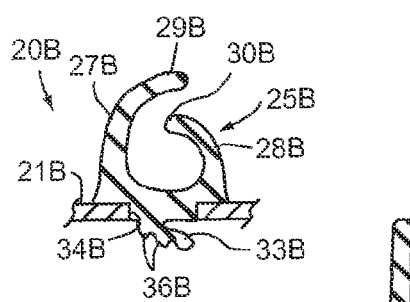
FIG. 7
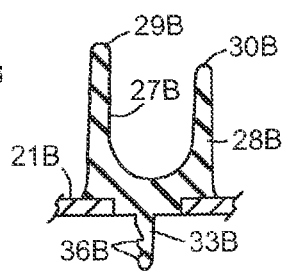
FIG. 8
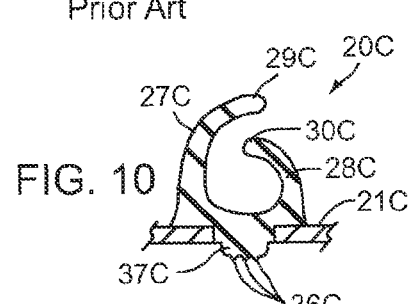
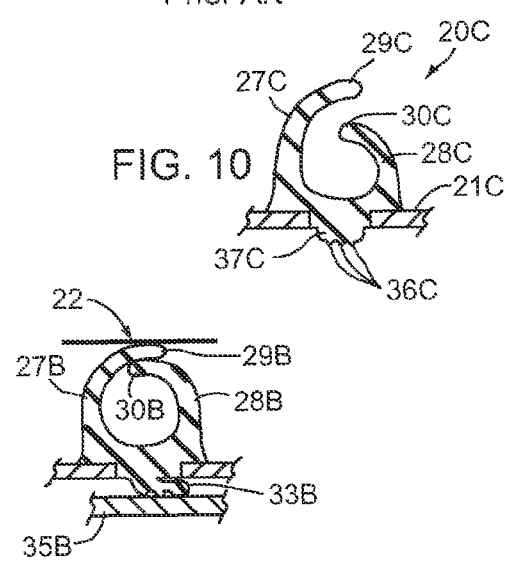
FIG. 9
FIG. 10

VEHICLE COWL COMPONENTS ADAPTED FOR HOOD/FENDER SEALING

CROSS-REFERENCE TO RELATED APPLICATION

This application claims benefit under 35 USC §119(e) of provisional application Ser. No. 61/555,670, filed Nov. 4, 2011, entitled VEHICLE COWL COMPONENTS ADAPTED FOR HOOD/FENDER SEALING the entire contents of which are incorporated herein by reference.

BACKGROUND

The present invention relates to vehicle cowl components bridging a gap between a vehicle's hood and front windshield, and more specifically relates to a cowl component with an integrally formed seal configured to sealingly engage a rear edge of a hood assembly in a manner blocking water and sound from passing from the engine component toward the windshield.

Vehicles include a cowl component bridging a gap between a vehicle's hood and front windshield and configured to reduce flow of water, sound, and emissions from the engine compartment toward the windshield. Traditionally, the cowl component has a cross-vehicle seal attached to its front edge that is located to abuttingly, sealingly engage a rear edge of a hood assembly when the hood assembly is closed. In one known prior art cowl product (FIG. 5), a cross-car bulb seal 80 is attached to a rear edge of the cowl 81 and extends upward to a location where a ridge 82 on the rear edge of an inner panel of the hood 83 will abuttingly compress the bulb seal 80 when the hood 83 is closed. However, this prior art sealing method is limited by cost and performance. For example, conventional bulb seals are costly to install since they must be bonded in a secondary operation to the underlying cowl component completely along their entire length, which is not easy given their lack of length-wise strength and lack of torsional strength, and their tendency to deform when gripped. Further, they can be expensive to inventory and difficult to manage in production systems.

In another prior art cowl product (FIG. 6), a cross-car J-shaped seal 90 is attached to a rear edge of the cowl 91 and includes an upwardly-extending curved single wall configured to abuttingly engage a ridge 92 on the rear edge of the hood 93 when the hood 93 is closed. The illustrated J-shaped seal may be separately attached in a secondary operation, or potentially can be bonded to the cowl in the second step of a two-shot molding operation. Two-shot wiper seals can be less costly since they eliminate secondary operations, but traditionally they sacrifice performance because of their curved single wall structure which does not always tightly, sealingly engage the hood's rear edge. Further, the single wall of the J-shaped seal 90 provides only one-wall-thick barrier to reduce flow of water, sound, and emissions.

An improved cowl component is desired that minimizes cost but also provides optimal sealing engagement against the hood's rear edge to reduce flow of water, sound, and emissions.

SUMMARY OF THE PRESENT INVENTION

In one aspect of the present invention, a vehicle cowl component configured to extend between a hood's rear edge and a vehicle front windshield comprises a cowl and a seal. The cowl includes a cross-car length and an under-hood edge. The seal includes a U-shaped cross section attached to the under-hood edge and having upwardly extending front and rear curved walls, each of the curved walls having an unconnected free end.

In another aspect of the present invention, a method of molding a cowl component configured to extend between a hood's rear edge and a vehicle front windshield, comprises steps of first-shot molding a cowl including a cross-car length and an under-hood edge, and second-shot molding a U-shaped seal onto the under-hood edge including molding front and rear curved walls, and including ejecting a combined part having the cowl and the seal with the seal's curved walls flexing to a straightened condition upon ejection but then deforming back to a curved shape upon post-molding cooling.

In another aspect of the present invention, a vehicle cowl component configured to extend between a hood's rear edge and a vehicle front windshield includes a cowl having a cross-car length and an under-hood edge, and a seal. The seal is attached to the under-hood edge and has at least one upwardly extending curved wall for sealing engagement with a hood and further has at least one downwardly extending wiper for sealing engagement with a body support structure under the cowl and seal.

These and other aspects, objects, and features of the present invention will be understood and appreciated by those skilled in the art upon studying the following specification, claims, and appended drawings.

BRIEF DESCRIPTION OF DRAWINGS

FIGS. 2A-4A are views of a modified seal similar to FIGS. 2-4 but with legs having a more consistent thickness along their length to their free ends.

FIG. 5 is a prior art cowl with bulb-seal attached in the environment of a hood assembly and window-glass supporting vehicle structure.

FIG. 6 is a prior art cowl with J-shaped seal two-shot molded onto a cowl and shown in the environment of a hood assembly and window-glass supporting vehicle structure.

FIGS. 7-9 are views of a modified seal similar to FIGS. 2-4 but with lower sealing flanges engaging the plenum body structure.

FIG. 10 is a modified seal similar to FIG. 7 but with further modified lower sealing flanges.

DETAILED DESCRIPTION OF PREFERRED EMBODIMENTS

Figure 1:
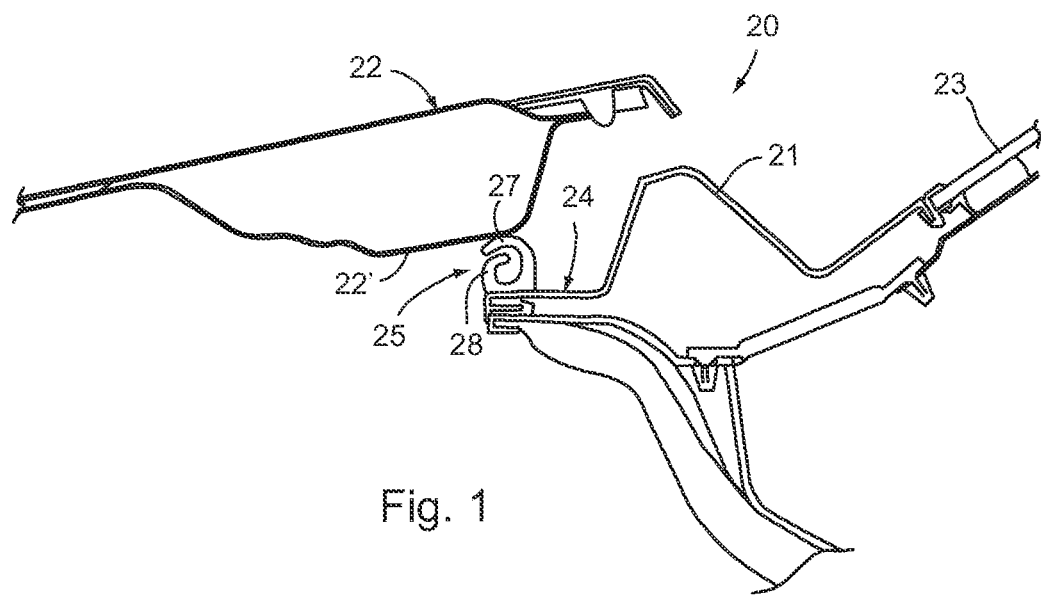
FIG. 1 is a cross-sectional view of a rear edge of a hood assembly, a front edge of a windshield with window-glass supporting vehicle structure, and a cowl including the present innovative two-shot, two-leg seal.
Figure 2:
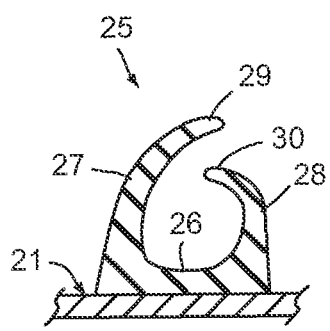
FIGS. 2-4 are views of the two-leg seal in FIG. 1, FIG. 2 being when in a molded condition, FIG. 3 being during ejection of the cowl with molded-on seal, and FIG. 4 being after cooling of the seal and cowl after molding.
Figure 3:
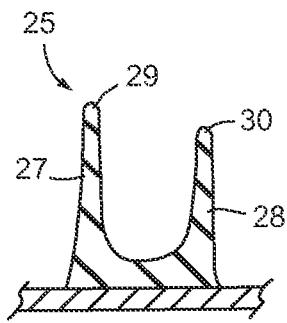

The present vehicle cowl component 20 (FIGS. 1-4) (also called a cowl leaf screen) includes a cowl 21 configured to extend between a hood's rear edge 22 and a vehicle front windshield 23, and includes an under-hood edge 24. Under-cowl body structure 19 provides structure to a front of the vehicle, and supports the glass front windshield 23 and the cowl component 20. A seal 25 is attached to the cowl 21 during a two-shot-molding process where the seal 25 is molded onto the under-hood edge 24 of the cowl 21. The two-shot process integrally bonds the seal 25 to the cowl 21 at the time of the two-shot molding process. The seal 25 includes a U-shaped cross section, with a generally flat-middle portion 26 attached/bonded to the under-hood edge 24 as part of the two-shot molding process. The seal 25 is made from an elastomer (such as TPE with siloxane additive), and as molded has upwardly extending front and rear curved walls 27 and 28 (when in a vehicle-mounted position). Each of the walls 27 and 28 are molded in a curved shape (FIG. 2) and curve toward each other as they extend from the middle portion 26. The curved walls 27 and 28 are flexible and resilient such that they flex away from each other during an ejection-phase of their molding toward a generally parallel condition (FIG. 3), and then flex back toward their curved shape during post-molding curing (FIG. 4).

Cowls are generally known in the art, and a detailed description is not required for a person skilled in this art. The illustrated cowl 21 is made from polypropylene and extends substantially a cross-car width of the vehicle's body for which it is designed, and extends from a front portion of the front windshield 23 to a location under a rear edge 22 of the hood assembly. A middle of the cowl 21 is designed as a leaf catcher and is shaped to manage water flow around a front of the windshield 23. The hood assembly typically includes a hood outer panel and a hood inner stiffener panel, or reinforcement, with the inner stiffener panel including a ridge 31 that extends generally parallel the mounting surface 32 for the seal 25 on the under-hood front edge 24 of the cowl 21.

Figure 4:
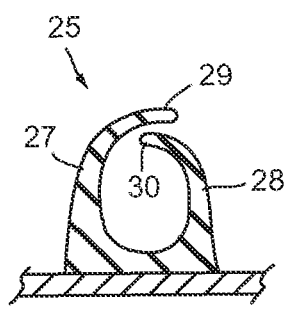
Figure 2A:
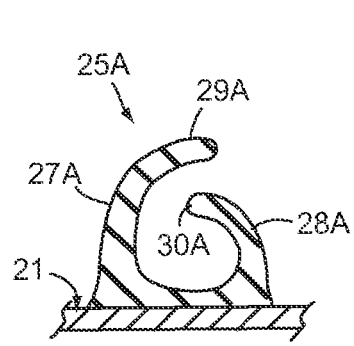
Figure 3A:
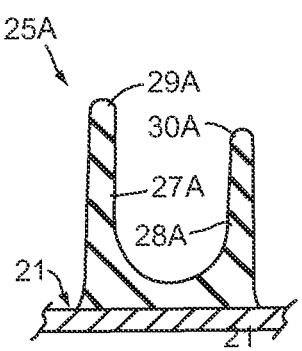
Figure 4A:
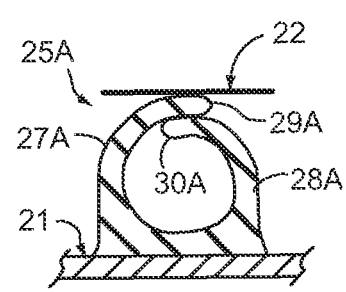

The curved walls 27 and 28 extend generally upwardly (when in a vehicle mounted position), with their free ends 29 and 30 being curved toward each other when in an as-molded state (FIG. 2) and when in a free state (FIG. 4). The rear curved wall 27 (when in a vehicle mounted position) is slightly longer than the front curved wall 28, which assists in assuring the that free ends 29 and 30 overlap instead of undesirably engaging each other prior to overlap. This arrangement of walls 27, 28 (i.e. the longer wall 27 being forward of the shorter wall 28) lets the wind from the engine compartment press rearward the longer wall 27 up toward the abutting hood surface on the hood inner panel 22', increasing sealing force as wind speed increases. A length of the walls 27 and 28 can be tailored to particular vehicle applications, but for example, the rear curved wall 27 can be 10% to 20% longer (or more, preferably about 20%-30% longer) than the front curved wall 28 to create a desired overlap relationship.

As illustrated, the unconnected free ends 29 and 30 of the curved walls 27 and 28 are molded in a slightly overlapped condition (FIG. 2) and then flexed generally straight during ejection (FIG. 3), but re-deform back to an overlap position after post-molding cooling (FIG. 4). Due to cooling-related stress and thermodynamic properties during molding and subsequent cooling, it is not uncommon for the free ends 29 and 30 to overlap to a greater extent after cooling than their overlapped relationship at the time of being molded (i.e. when still in the molding dies). For example, the portion of steel in the molding die that cores out the interior cavity of the U-shaped seal (i.e. that forms the cavity between walls 27 and 28 during molding) is difficult to cool in the molding dies and will tend to pick up heat and thus not cool polymeric material as well as other parts of the molding die during the molding process. This causes the illustrated phenomena illustrated by FIGS. 2-4.

The present seal/cowl design is tooled in a die lock state within a two-shot injection mold directly to the leaf screen main body of the cowl. Two standing wiper walls 27 and 28 (one shorter than the other) are designed to overlap each other slightly in the injection tool. This will allow tool steel to core out the center of the U-shaped seal 25. The die locked double wiper is able to eject out of the mold utilizing a flexibility of the plastic resin making up the seal, such as elastomer material. The area between the double wiper design is preferably a constant radius of the same flexible resin, forcing the wipers to collapse during post mold shrinkage. This shrinkage is significant and potentially important to the function of this seal, turning the U-shape double wiper into a tighter closed O-shape that simulates a bulb seal. The top wiper end faces forward against the direction of air flow to insure maximum sealing. Also, the wiper wall 28 helps bias the wall 27 upwardly against the hood inner panel 22'.

The two curved walls 27 and 28 provide good reliable sealing across their length, such that they form an improved "double wall" barrier to water and noise and emissions attempting to pass from the engine compartment toward the windshield 23. Further, the two walls 27 and 28 provide a substantially increased barrier to noise transfer due to the combined thickness of the two walls 27 and 28, and further due to the spaced nature of the two walls, and also due to their cumulative upward biasing force of sealing engagement.

FIGS. 2A-4A illustrate a cowl component 20A including a cowl 21 and modified seal 25A. The seal is similar to seal 25, like legs 27 and 28, the legs 27A and 28A are slightly thicker and have a more consistent thickness along their length, while the legs 27A and 28A are thinned slightly at their tips 29A and 30A. A result is a slightly different curvature at the time of post-molded cooling.

A related method of molding a cowl component is disclosed. The method includes first-shot molding a cowl including a cross-car length and an under-hood edge, and second-shot molding a U-shaped seal onto the under-hood edge including molding front and rear curved walls (see FIG. 2). The method further includes ejecting a combined part having the cowl and the seal with the seal's curved walls flexing to a straightened condition upon ejection (FIG. 3) but then deforming back to a curved shape upon post-molding cooling (FIG. 4).

FIGS. 7-9 show a cowl component 20B with cowl 21B and modified seal 25B. The seal 25B is similar to seal 25, and includes curved walls 27B and 28B with ends 29B and 30B that overlap upon post-mold cooling. Seal 25B further includes a lower wiper 33B (called "sealing flange") constructed to extend through an aperture 34B in the cowl 21B to seal against a mating surface on the body support structure 35B (also called a plenum). The wiper 33B is flexible, and resiliently bends to accommodate sealing engagement despite variations in the spaced relationship of the cowl 21B, the seal 25B, and the body support structure 35B. The illustrated wiper 33B includes transverse ridges 36B and channels along its length to provide multi-point contacts, which facilitates sealing engagement with the body support structure 35B despite surface variations on the body support structure 35B.

It is noted that the cowl component and seal can be modified to have many different profiles and still be within the scope of the present invention. Specifically, the wiper can be relatively short and wide, such as 3-4 times wider than it is in a downward direction. The wiper also can include a plurality of ridges and channels for multi-point contact with the mating surface of the body support structure. Much of the flexibility of the wiper is in the deformability of the material at a base of the seal, which base is sufficient in size to permit upward bulging of material when experiencing upward pressure from the body support structure below.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A vehicle cowl component configured to extend between a hood's rear edge and a vehicle front windshield, comprising:
   a cowl including a cross-car length and an under-hood edge; and
   a seal having a U-shaped cross section attached to the under-hood edge and having upwardly extending front and rear curved walls, each of the curved walls having an unconnected free end;
   wherein the seal includes a lower wiper extending downward and configured to sealingly engage a mating surface on a body support structure spaced below and under a portion of the cowl and seal.

2. The cowl component defined in claim 1, wherein the front and rear curved walls are different lengths by at least 10%.

3. The cowl component defined in claim 1, wherein the free ends overlap.

4. The cowl component defined in claim 1, wherein one of the curved walls is 20-30% longer than the other curved wall.

5. The cowl component defined in claim 1, wherein the cowl and seal are integrally attached by the materials of the cowl and seal.

6. The cowl component defined in claim 5, wherein the seal is molded onto the cowl in a two-shot molding process, with the seal bonding to the cowl without separate adhesive material.

7. The cowl component defined in claim 1, wherein the curved walls are resilient and flexible to straighten upon ejection, but are shaped to deform back to a curved shape after ejection.

8. A vehicle cowl component configured to extend between a hood's rear edge and a vehicle front windshield, comprising:
   a cowl including a cross-car length and an under-hood edge; and
   a seal having a cross section attached to the under-hood edge and having at least two upwardly extending curved walls with free ends for sealing engagement with a hood and having at least one downwardly extending wiper for sealing engagement with a body support structure under the cowl and seal.

* * * * *